Oct. 25, 1938.   C. G. QUICK ET AL   2,134,532
DELIVERY MECHANISM FOR USE WITH PRINTING MACHINES
Filed Dec. 21, 1935   4 Sheets-Sheet 1
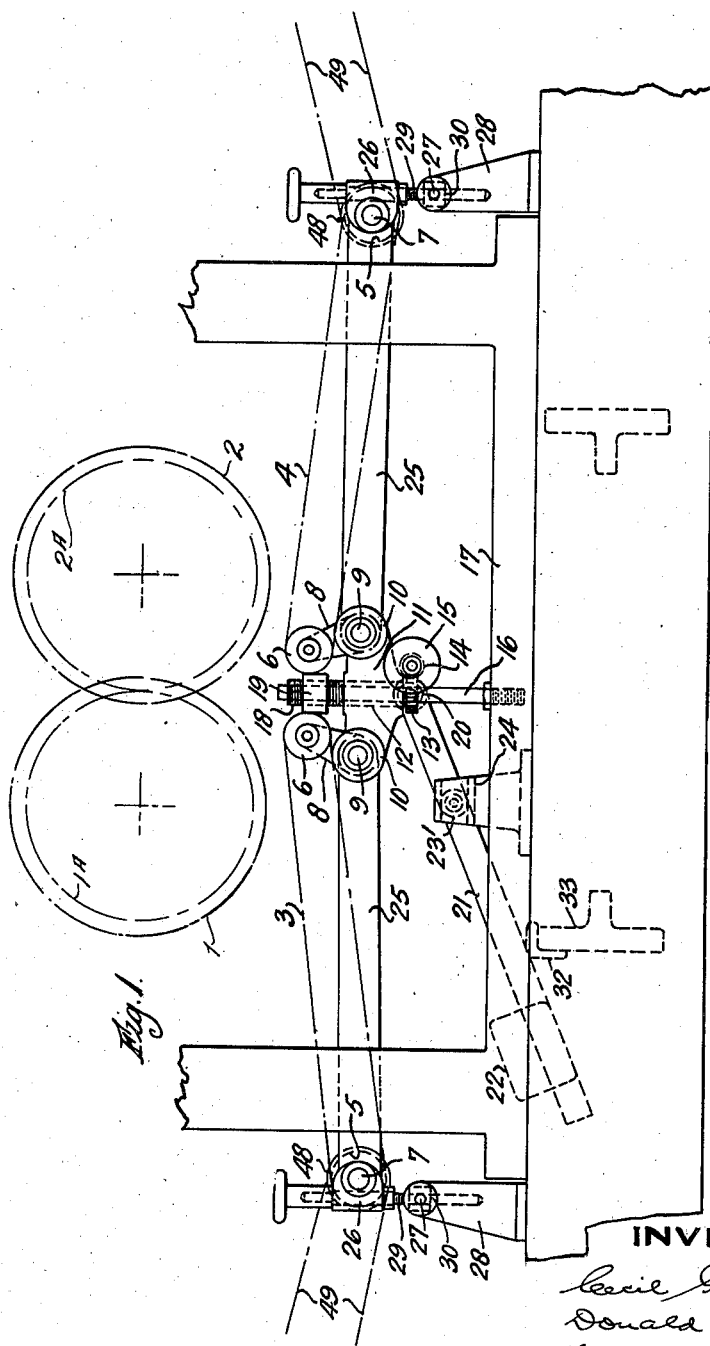
INVENTORS.
Cecil G. Quick
Donald A. Ball
William A. Whitehead
by Albert J. Horton
ATTY.

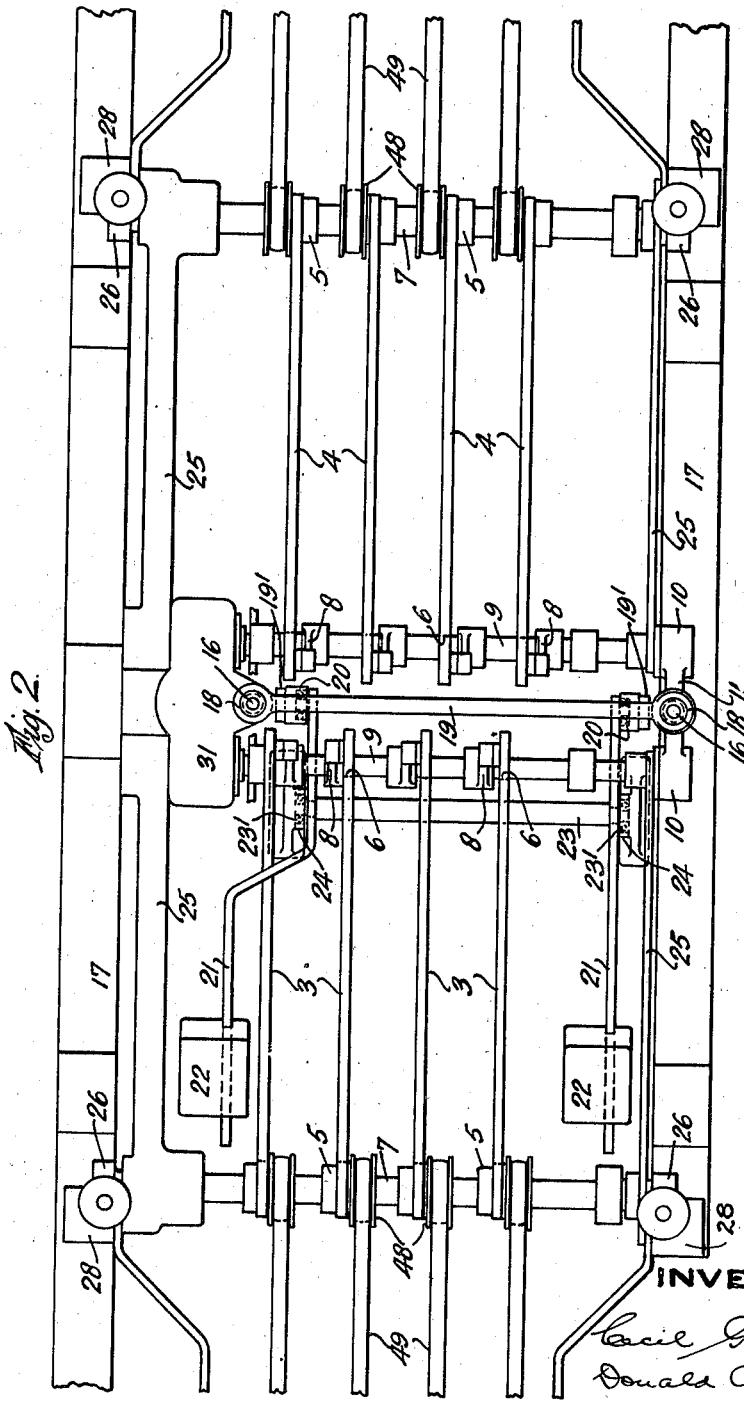

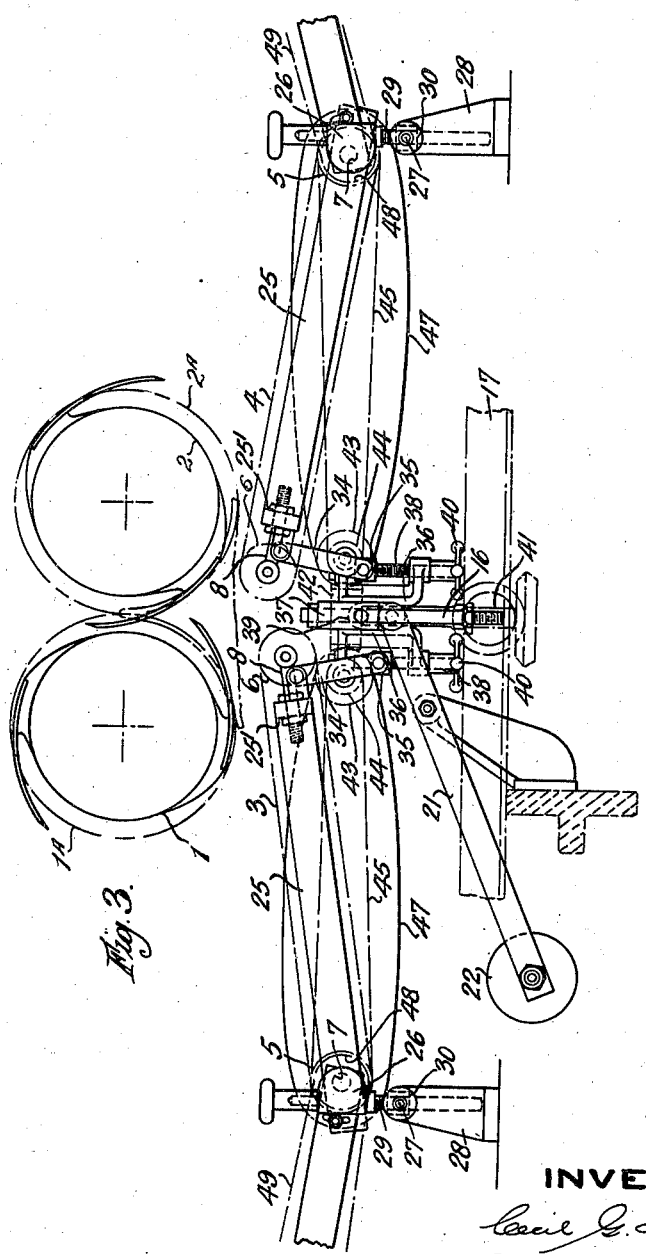

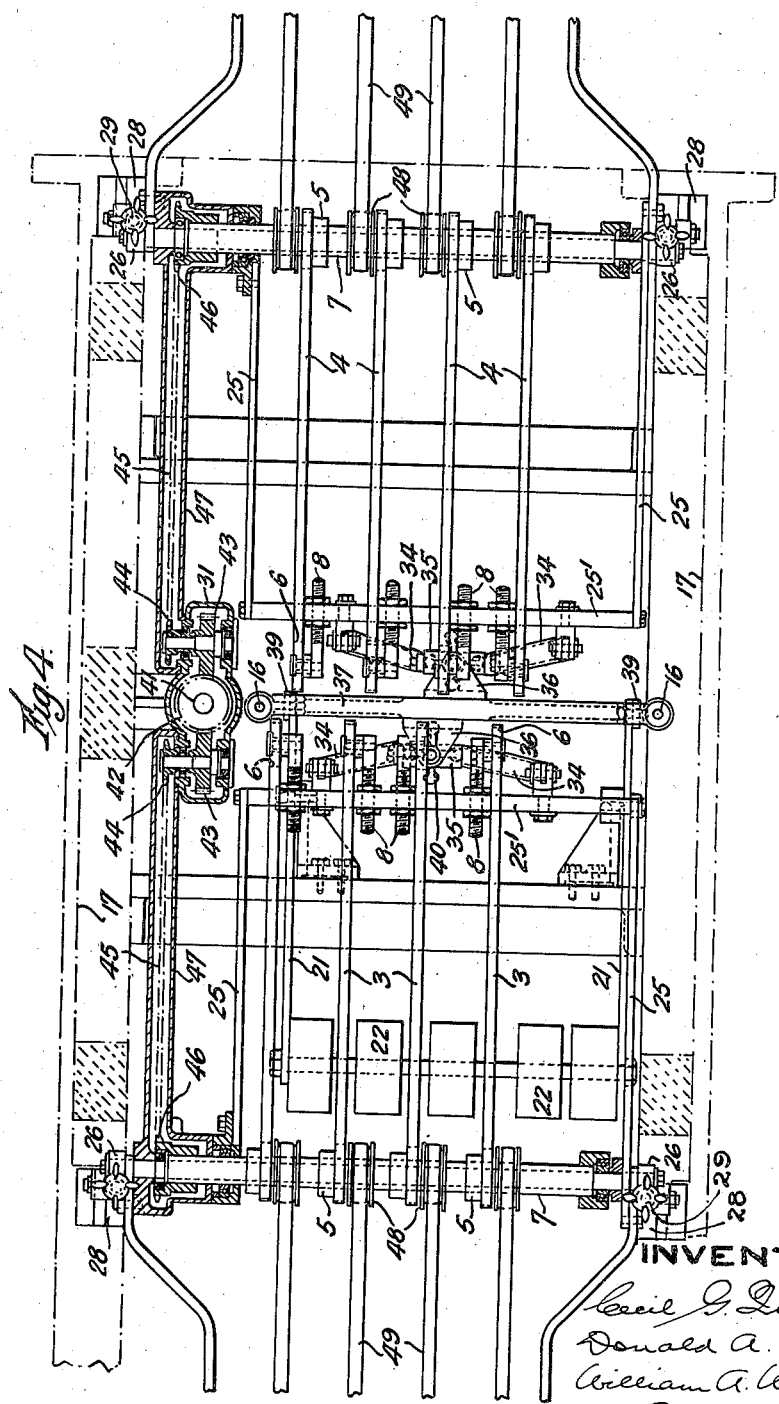

Patented Oct. 25, 1938

2,134,532

UNITED STATES PATENT OFFICE 2,134,532

DELIVERY MECHANISM FOR USE WITH PRINTING MACHINES

Cecil George Quick, Donald Arthur Ball, and William Arnold Whitehead, London, England, assignors to R. Hoe & Co., Inc., New York, N. Y., a corporation of New York Application December 21, 1935, Serial No. 55,519½
In Great Britain December 21, 1934

20 Claims. (Cl. 271—80)

This invention relates to improvements in delivery mechanism for use with printing machines and is concerned with delivery mechanism employing what is known as a delivery "fly" (i. e. a device comprising hub members having blades secured thereto to provide pockets for the reception of products), and a conveyor chain, belt or other endless member to which the fly delivers products.

The distance separating the operative run of the conveyor device and the delivery side of the fly is necessarily small to ensure that the products are delivered efficiently to the device and hence if a defect occur resulting in, for example, deformation of a product, the space between the conveyor and the fly may rapidly become choked with products which the fly continues to deliver, resulting in damage especially to the blades of the fly.

The main object of the present invention is to provide an arrangement in which the risk of damage due to the choking referred to, is minimized or avoided and one which will assist in enabling the apparatus to "clear" itself.

According to the present invention the conveyor device is so carried that at least that part adjacent the fly can yield to increase its distance from the fly. Thus, in the event of a choke occurring, the conveyor would yield by reason of the pressure due to the choke. It is also preferred to provide means whereby the normal distance between the conveyor device and the fly can be adjusted to suit the different products to be dealt with by the mechanism.

The invention is of especial value when applied to the mechanism described and claimed in our pending application Serial No. 222, filed January 3, 1935, this mechanism comprising two flies arranged about a zone to which products are successively fed and the two flies operating alternately to take products and to deliver the products each to its own conveyor device, the two conveyor devices extending in opposite directions. In such an arrangement the space between the two flies and the two conveyor devices is confined and the risk of the choking of the space would not only be greater than with a single fly and conveyor device but would also be more difficult to clear, the latter factor being of importance where a large production is required in a limited time as in newspaper production.

The invention is illustrated in the accompanying drawings in which Figure 1 is a side elevation and Figure 2 a plan view of one form of construction and Figures 3 and 4 are respectively similar views of a modified form of construction. In both constructions the invention is shown applied to the mechanism described and claimed in our above noted application according to which two flies 1, 2 are employed and to which products are successively fed, the two flies operating alternately by means of gears 1a and 2a, which are in mesh, one of which is drivingly connected to the machine drive (not shown) in the usual manner to take products and to deliver the products each to its own conveyor. The conveyors comprise belts or chains 3, 4 which extend in opposite directions away from the flies and are driven in opposite directions so that they convey products from the respective flies to opposite sides of the machine.

Referring now to the construction shown in Figures 1 and 2, each of the belts 3, 4 passes around pulleys 5 and 6, the pulleys 5 being secured to a shaft 7 and the pulleys 6 being rotatably supported by brackets 8 carried by cross shafts 9 which at one end are journalled in lug extensions 10 on brackets 11 and at the other ends the shafts 9 are journalled in a casing 31. These brackets 11 and casing 31 are mounted on tubular members 12 and the bracket and casing rest at their lower ends on the bosses of worm wheels 13 in mesh with worms 14 journalled in the bracket 11 and casing 31 and provided with operating handwheels 15, the worms and worm wheels locking the bracket 11 and the casing 31 and the tubes 12 together. In the drawings only one of the worms and worm wheels 14, 13 is shown for the bracket 11 it being understood that the casing 31 is similarly provided with a worm and wheel. The tubular members 12 are slidable on vertical posts 16 secured to the machine frame 17 the plane containing the axis of the rods passing centrally between the two flies 1, 2. The tubular members 12 are extended upwardly beyond the bracket 11 and casing 31 and these extended portions are screw threaded as indicated at 18 and engage internal threads formed in apertures at each end of a transverse bar 19 and from this bar depend arms or lugs 19′ at or near each end of the bar.

The lower end of each arm 19′ is pivotally connected at 20 to one end of a lever 21 pivotally supported between its ends and having a weight 22 at its other end. The pivotal mounting for the levers consists of a shaft 23 to which the levers are secured and which is provided at its ends with rollers 23′ running between the flanges of horizontal and fixed U-shaped guideways 24 so as to enable the pivotal axis to be displaced in a horizontal direction.

To the bracket 11 and to the casing 31 are pivotally connected, one of the ends of the side arms 25, the pivotal connections being effected about an axis coaxial with the axis of the shaft 9; the two side arms 25 extending to the other (or remote) shafts 7 of the conveyors and being journalled thereon. The shafts 7 are themselves rotatably journalled at their ends in brackets 26 which are mounted to pivot at 27 about horizontal axes on fixed brackets 28, the height of the shafts 7 being adjustable by supporting the brackets 26 through screw threaded rods 29 entering threaded apertures in blocks 30 pivoted in the brackets 28.

The shafts 9 are arranged to pass through the casing 31 into connection at one end with the side arms 25. The casing 31 is employed to house gearing by which drive can be transmitted from a common shaft to the two shafts 7 and hence to the belts: this mechanism is shown in greater detail in Figures 3 and 4 and will be hereinafter referred to.

It will now be seen that in effect each of the conveyors is supported by a framework (comprised of the parts 8 and 25) which is pivotally supported at one end remote from its fly and is mounted to rise and fall at its other end against the action of the weights, i. e. the bracket 11 and casing 31 together with the tubular members 12 can slide down the vertical posts 16 against the action of the weighted levers 21 which are caused to rock and also slightly to slide due to the angular motion: the levers tend, by reason of the weights, to restore the bracket and casing to their normal "up" position and this position is determined by stop pads 32 carried by a cross member 33, the levers 21 engaging the pads in the limiting position. This movement is partaken by the shafts 9 and hence by the corresponding ends of the belts or chains 3, 4 which, due to the side arms 25 virtually rock about the axes of the remote shafts, these shafts 7 moving bodily about the horizontal axes connecting the bracket 26 to the fixed brackets 28 thus, should a choke occur in the space between the flies 1, 2 and the belts or chains 3, 4, the belts or chains can yield against the action of the weights and thus prevent or minimize the risk of damage and also facilitate the clearing of the choke.

It will also be seen that by rotating the hand wheels 15 the worm wheels 13 and hence the tubular members 12 are rotated and by reason of the screw threaded portion 18 of the tubular members 12 these members, and hence the bracket 11 and casing 31 carried by them, are raised or lowered with respect to the nut members which take their reaction from the weighted levers: thus, the normal position of the belts or chains with respect to the delivery side of the fly can be adjusted to suit different products.

Referring now to the modification shown in Figures 3 and 4 (in which parts similar to those referred to in connection with Figures 1 and 2 have similar reference numerals) the arrangement is such that each conveyor can be adjusted individually as to its separation from the lower side of the corresponding delivery fly 1 or 2. To effect this the brackets 8 are connected to a cross member 25' secured to the side arms 25 and which is connected by links 34 to blocks 35 adjustably carried by brackets 36 secured to a cross beam 37 and slidable on the posts 16. The adjustment mechanisms comprise screw-threaded rods 38 which are mounted to rotate in the brackets 36 and are arranged to be rotated by hand wheels 40, the blocks 35 being screw threaded to receive the rods so that by rotation of the rods the blocks 35 are caused to rise or fall in the brackets 36 and the pulleys correspondingly adjusted with respect to the flies.

It will be apparent that apart from this feature of individual adjustment, the brackets 36 and cross beam 37 are equivalent to the structure consisting of the bracket 11 and casing 31 and bar 19 shown in Figures 1, 2, the cross beam 37 being connected by links 39 to the weighted levers 21.

In this modification also is shown the arrangement by which drive is transmitted from a common drive shaft 41 to the two conveyors. This is effected by provding the shaft with a skew gear 42 in mesh with two skew gears 43 each journalled in the casing 31 and provided with chain wheels 44 around which pass chains 45 extending to chain wheels 46 secured to one of the ends of the shafts 7. It is to be observed that in the arrangement shown in Figures 1 and 2 one of the side arms is formed hollow so as to provide a housing for the chains and chain wheels, this however necessitates the casing 31 and the gearing 42, 43 being carried by the bar 19 and having to move therewith but in the arrangement shown in Figures 3 and 4 this is avoided by forming the casing 31 separate from the cross beam 37 so that the casing is stationary and by providing a chain and chain wheel housing 47 separate from the side arms 25.

In the arrangement shown in Figures 3 and 4 the operation is similar to that described with reference to Figures 1 and 2, i. e. should a choke occur in the zone between the flies and the conveyors, the conveyors can yield against the action of the weights 22 the conveyors being returned by the weights when the choke is cleared.

It is to be understood that the invention is shown applied to an arrangement consisting of two flies and conveyors by way of example only: the invention is obviously capable of application to an arrangement employing but one fly and one conveyor.

If desired the shafts 7 may have secured thereto further pulleys or chain wheels 48 for further belts or chains 49 extending beyond those already referred to so as to provide an extended delivery.

What we claim is:—

1. In combination, a delivery fly, an endless conveyor spaced from the fly, means rotating the fly, means to cause the conveyor to move past the fly in position to have the products carried by the fly discharged thereon, and means having yielding properties acting upon at least a part of the conveyor to continuously urge it into position adjacent the fly, said urging means due to its yielding properties, allowing the conveyor part to be temporarily further spaced from the fly by an excess of products passing therebetween.

2. In combination, a delivery fly, an endless conveyor, guide means around which the conveyor is trained and which is located to constrain one run of the conveyor to pass adjacent the fly, means to move the conveyor past the fly, means to rotate the fly, said conveyor being positioned to have the products carried by the fly discharged to the adjacent run of the conveyor, and means continuously acting to bias the guide means into normal position to dispose the conveyor in product receiving position and being yieldable to automatically permit temporary movement of said guide means out of its normal position to allow passage of an excess of products and to return it to its normal position after the passage of the excess of products.

3. In combination, a delivery fly, means rotating the fly, an endless conveyor, a guide device about which the conveyor is trained at each end of its run, a framework carrying the guide device at one end of the run of the conveyor, means supporting the framework for angular movement, and yieldable means continuously acting upon the framework to bias it into a normal position to dispose one run of the conveyor into a normal position adjacent the fly, said yieldable means being actuated by an excess of products passing between the fly and the adjacent run of the conveyor to yield temporarily and thereby permit an increased separation between the fly and the said adjacent run of the conveyor.

4. In combination a delivery fly, means rotating the fly, an endless conveyor, guide device about which the conveyor is trained at each end of its run, a framework carrying the guide device at one end of the run, means supporting the framework for angular movement and a weighted lever operating on the framework and biasing the framework to assume a normal position with one run of the conveyor adjacent the fly and allowing the framework to rock to increase the distance separating the said run from the fly.

5. In combination a delivery fly, means rotating the fly, an endless conveyor, rotatable members about which the conveyor is trained at each end of its run, a cross member supporting the rotatable members at one end of the run, arms to which the cross member is connected, means supporting the arms for pivotal movement at their ends remote from the cross member, a weighted lever, means supporting the lever for pivotal movement and connections between the lever and the structure constituted by the arms and cross member, the arms being so disposed that the weighted lever holds one run of the conveyor at a normal position adjacent the fly and allows the structure to yield to increase the separation between the said run and the fly.

6. In combination two flies, means supporting the flies about a zone to which products are fed, means rotating the flies in opposite directions, the flies being set so as alternately to take products, two conveyors one for each fly, guide means constraining the conveyors to extend in opposite directions from one another and normally positioned with one of their runs adjacent the respective flies, means moving the conveyors in opposite directions, said conveyors being positioned to have the products carried by the flies discharged to their respective conveyors, and yieldable means simultaneously and continuously operating on the two conveyors to yieldingly support them in normal position whereby the conveyors will temporarily yield together to increase the separation between the two flies and the said runs when an excess of products pass therebetween.

7. In combination two flies, means supporting the flies about a zone to which products are fed, means rotating the flies in opposite directions, the flies being set so as to take alternate products, two conveyor devices one for each fly, and extending in opposite directions, movable guide means constraining one run of each conveyor to pass adjacent its respective fly, means supporting the guide means of the adjacent ends of the two conveyors for movement to increase and decrease the separation between the said runs and the said flies, means interconnecting the said movable guide means of the two conveyors and means biasing the said interconnected guide means to assume a normal position and permitting the said interconnected guide means to yield to increase the separation between the said two runs and the said two flies.

8. In combination two flies, means supporting the flies about a zone to which products are fed, means rotating the flies in opposite directions, the flies being set so as to take alternate products, two conveyor devices one for each fly, guide members about which the conveyors are trained and which are disposed that the conveyors extend in opposite directions from each other and with one of their runs adjacent the respective fly, a member interconnecting the guide devices of the adjacent ends of the two conveyors, a second member by which the first member is constrained to slide in the median plane between the two flies, and means biasing the first member to assume a normal position with the guide devices of the adjacent ends of the two conveyors holding the said runs with the normal separation from the respective flies, the said biasing means permitting the interconnecting member to yield to increase the separation between the said runs and the flies.

9. In combination two flies, means supporting the flies about a zone to which products are fed, means rotating the flies in opposite directions, the flies being set so as to take alternate products, two conveyors one for each fly, guide members about which the conveyors are trained and which are disposed so that the conveyors extend in opposite directions from each other and with one of their runs adjacent the respective fly, oppositely directed frames supporting at their adjacent ends the guide members of adjacent ends of the two conveyors, means supporting the remote ends of the frames for pivotal movement, a guide member disposed between the remote ends of the two frames, a slide member slidable on the guide member, means interconnecting the adjacent ends of the two frames to the slide member, and means biasing the slide to assume a normal position with the said runs adjacent the two flies and permitting the two frames to rock to increase the distance separating the runs and the flies.

10. In combination two flies, means supporting the flies about a zone to which products are fed, means rotating the flies in opposite directions, the flies being set so as to take alternate products, a guide member disposed in the plane between the two flies, a slide member slidable upon the guide member, two conveyors one for each fly, and extending in opposite direction about the slide member, guide devices for the adjacent ends of the conveyors and disposed about the slide member, means connecting the guide devices to the slide member, and means biasing the slide member to cause the guide devices connected thereto to assume a normal position with one of the runs of the conveyors adjacent the respective fly, the biasing means permitting the slide member to yield to increase the separation between the said runs and the two flies.

11. In combination two flies, means supporting the flies about a zone to which products are fed, means rotating the flies in opposite directions, the flies being set so as to take alternate products, a guide member disposed in the plane between the two flies, a slide member slidable upon the guide member, two conveyors one for each fly, and extending in opposite direction about the slide member, guide devices for the adjacent ends of the conveyors and disposed about the slide member, rotary guide devices for the remote ends of the two conveyors, means connecting the guide devices for the adjacent ends of the two conveyors to the slide member, arms articulated to the slide member, the arms extending in opposite directions from the slide member, means pivotally supporting the remote ends of the arms for pivotal movement about the axes of the rotary guide devices for the remote ends of the two conveyors, and means biasing the slide member to cause the guide members connected thereto to assume a normal position with one of the runs of the conveyors adjacent the respective fly, the biasing means permitting the slide member to yield to increase the separation between the said runs and the two flies.

12. In combination two flies, means supporting the flies about a zone to which products are fed, means rotating the flies in opposite directions, the flies being set so as to take alternate products, two conveyor devices one for each fly, and extending in opposite direction, guide means constraining one run of each conveyor to pass adjacent its respective fly, means supporting the guide means of the adjacent ends of the two conveyors for movement to increase and decrease the separation between the said runs and the said flies, means interconnecting the said movable guide means of the two conveyors and a gravity biased member operating on the said interconnected guide means and biasing the means to assume a normal position and permitting the said interconnected guide means to yield to increase the separation between the said two runs and the said two flies.

13. In combination two flies, means supporting the flies about a zone to which products are fed, means rotating the flies in opposite directions, the flies being set so as to take alternate products, two conveyor devices one for each fly, guide members about which the conveyors are trained and which are disposed that the conveyors extend in opposite directions from each other and with one of their runs adjacent the respective fly, a member interconnecting the guide members of the adjacent ends of the two conveyors, a second member by which the first member is constrained to slide in the median plane between the two flies, a weighted lever and means connecting the lever to the first member and causing the member to assume a normal position with the guide members of the adjacent ends of the two conveyors holding the said runs in the normal separation from the two flies, the lever permitting the interconnecting member to yield to increase the separation between the said runs and the said flies.

14. In combination two flies, means supporting the flies about a zone to which products are fed, means rotating the flies in opposite directions, the flies being set so as to take alternate products, two conveyor devices one for each fly, and extending in opposite directions, guide means constraining one run of each conveyor to pass adjacent its respective fly, means supporting the guide means of the adjacent ends of the two conveyors for movement to increase and decrease the separation between the said runs and the said flies, adjustable means interconnecting the said movable guide means of the two conveyors and means biasing the said interconnected guide means to assume a normal position and permitting the said interconnected guide means to yield to increase the separation between the said two runs and the said two flies.

15. In combination two flies, means supporting the flies about a zone to which products are fed, means rotating the flies in opposite directions, the flies being set so as to take alternate products, two conveyors one for each fly, guide members about which the conveyors are trained and which are disposed so that the conveyors extend in opposite directions from each other and with one of their runs adjacent the respective fly, oppositely directed frames supporting at their adjacent ends the guide members of adjacent ends of the two conveyors, means supporting the remote ends of the frames for pivotal movement, a guide member disposed between the remote ends of the two frames, a slide member slidable on the guide member, adjustable means interconnecting the adjacent ends of the two frames to the slide member, and means biasing the slide member to assume a normal position with the said runs adjacent the two flies and permitting the two frames to rock to increase the distance separating the runs and the flies.

16. In combination two flies, means supporting the flies about a zone to which products are fed, means rotating the flies in opposite directions, the flies being set so as to take alternate products, a guide member disposed in the plane between the two flies, a slide member slidable upon the guide member, two conveyors one for each fly, and extending in opposite direction about the slide member, guides devices for the adjacent ends of the conveyors and disposed about the slide member, adjustable means connecting the guide devices to the slide member, and means biasing the slide member to cause the guide members connected thereto to assume a normal position with one of the runs of the conveyors adjacent the respective fly, the biasing means permitting the slide member to yield to increase the separation between the said runs and the two flies.

17. In combination two delivery flies, means supporting the two flies in side by side relationship, means rotating the flies in opposite directions, two endless conveyor devices one for each fly, means supporting the two conveyors so that their operative run is below the respective fly and normally positioned a determined space therefrom and so that they extend in opposite directions, and automatically operable yielding means for supporting the conveyors and constantly urging them into normal position, whereby they may yield temporarily to increase the distance between the same and the said flies.

18. In combination two delivery flies, means supporting the two flies in side by side relationship, means rotating the flies in opposite directions, two endless conveyor devices, one for each fly, means supporting the two conveyors so that their operative run is below the respective fly and normally positioned a determined space therefrom and so that they extend in opposite directions, and automatically operable yielding means for supporting the two conveyors and continuously biasing them into normal position, whereby they may yield simultaneously under influence of an excess of products passing between one of them and its respective fly to increase the separation between the same and the said flies.

19. In combination, a delivery fly member, a conveyor member disposed to receive products from the fly member, and a yieldable support for one of the members continuously urging it towards the other of said members and being adapted to be actuated by an excess of products passing between said members, to automatically and temporarily increase the distance between said members.

20. In combination, a pair of delivery fly devices, means supporting the pair of fly devices in side by side relationship, means to rotate the fly devices in opposite directions, a pair of endless conveyor devices, one cooperating with each fly device, means to support the pair of conveyor devices so that their operative run is spaced from and below the respective fly device and so that they extend in opposite directions, and yieldable means supporting one pair of devices and continuously urging the same toward the other pair of devices, and being adapted to be actuated by an excess of products passing between a cooperating pair of devices to automatically and temporarily increase the distance separating the cooperating pairs of devices.

CECIL GEORGE QUICK.
DONALD ARTHUR BALL.
WILLIAM ARNOLD WHITEHEAD.